United States Patent
Wen et al.

(10) Patent No.: US 11,298,692 B2
(45) Date of Patent: Apr. 12, 2022

(54) ACTIVE SCR CATALYST

(71) Applicant: Umicore AG & Co. KG, Hanau-Wolfgang (DE)

(72) Inventors: Fei Wen, Kahl am Main (DE); Nicola Soeger, Nidderau (DE); Yvonne Demel, Altenstadt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 142 days.

(21) Appl. No.: 16/649,640

(22) PCT Filed: Sep. 21, 2018

(86) PCT No.: PCT/EP2018/075660
§ 371 (c)(1),
(2) Date: Mar. 21, 2020

(87) PCT Pub. No.: WO2019/072527
PCT Pub. Date: Apr. 18, 2019

(65) Prior Publication Data
US 2021/0362139 A1   Nov. 25, 2021

(30) Foreign Application Priority Data
Oct. 9, 2017  (EP) .................. 17195355

(51) Int. Cl.
*B01J 23/42*  (2006.01)
*B01J 29/76*  (2006.01)
*B01J 35/10*  (2006.01)
*B01J 37/02*  (2006.01)
*F01N 3/08*  (2006.01)
*F01N 3/20*  (2006.01)

(52) U.S. Cl.
CPC .......... *B01J 29/7615* (2013.01); *B01J 23/42* (2013.01); *B01J 35/1014* (2013.01); *B01J 35/1019* (2013.01); *B01J 37/0215* (2013.01); *B01J 37/0246* (2013.01); *F01N 3/0842* (2013.01); *F01N 3/2066* (2013.01); *F01N 2610/02* (2013.01)

(58) Field of Classification Search
CPC .. B01D 46/2418; B01D 53/56; B01D 53/565; B01D 53/9418; B01D 53/9422; B01D 2255/20738; B01D 2255/502; B01D 2257/402; B01D 2257/404; B01D 2258/012; B01J 29/7215; B01J 29/7615; B01J 2523/12; B01J 2523/842; F01N 3/035; F01N 3/2066; F01N 2250/02; F01N 2370/04; F01N 2570/14; F01N 2570/145
See application file for complete search history.

(56) References Cited

U.S. PATENT DOCUMENTS

| | | | |
|---|---|---|---|
| 9,138,685 B2 * | 9/2015 | Tokunaga | ............ B01J 37/0201 |
| 9,675,935 B2 * | 6/2017 | Naraki | .................. B01J 35/002 |
| 2002/0044902 A1 | 4/2002 | Delahay | |
| 2008/0145310 A1 | 6/2008 | Breuninger | |

FOREIGN PATENT DOCUMENTS

| | | | | |
|---|---|---|---|---|
| CN | 100425534 C | * | 10/2008 | ............. C01B 39/10 |
| WO | 2006050820 A1 | | 5/2006 | |

OTHER PUBLICATIONS

International Search Report received in PCT/EP2018/075660, dated Dec. 7, 2018.
Written Opinion received in PCT/EP2018/075660, dated Dec. 7, 2018.

* cited by examiner

*Primary Examiner* — Timothy C Vanoy
(74) *Attorney, Agent, or Firm* — Suzannah K. Sundby, Esq.; Canady + Lortz LLP

(57) ABSTRACT

The invention relates to a catalyst containing a BEA-type zeolite which contains iron as well as 0.05 to 1 percent by weight of sodium, the weight percentage being relative to the iron-exchanged zeolite and being calculated as metallic sodium.

15 Claims, 1 Drawing Sheet

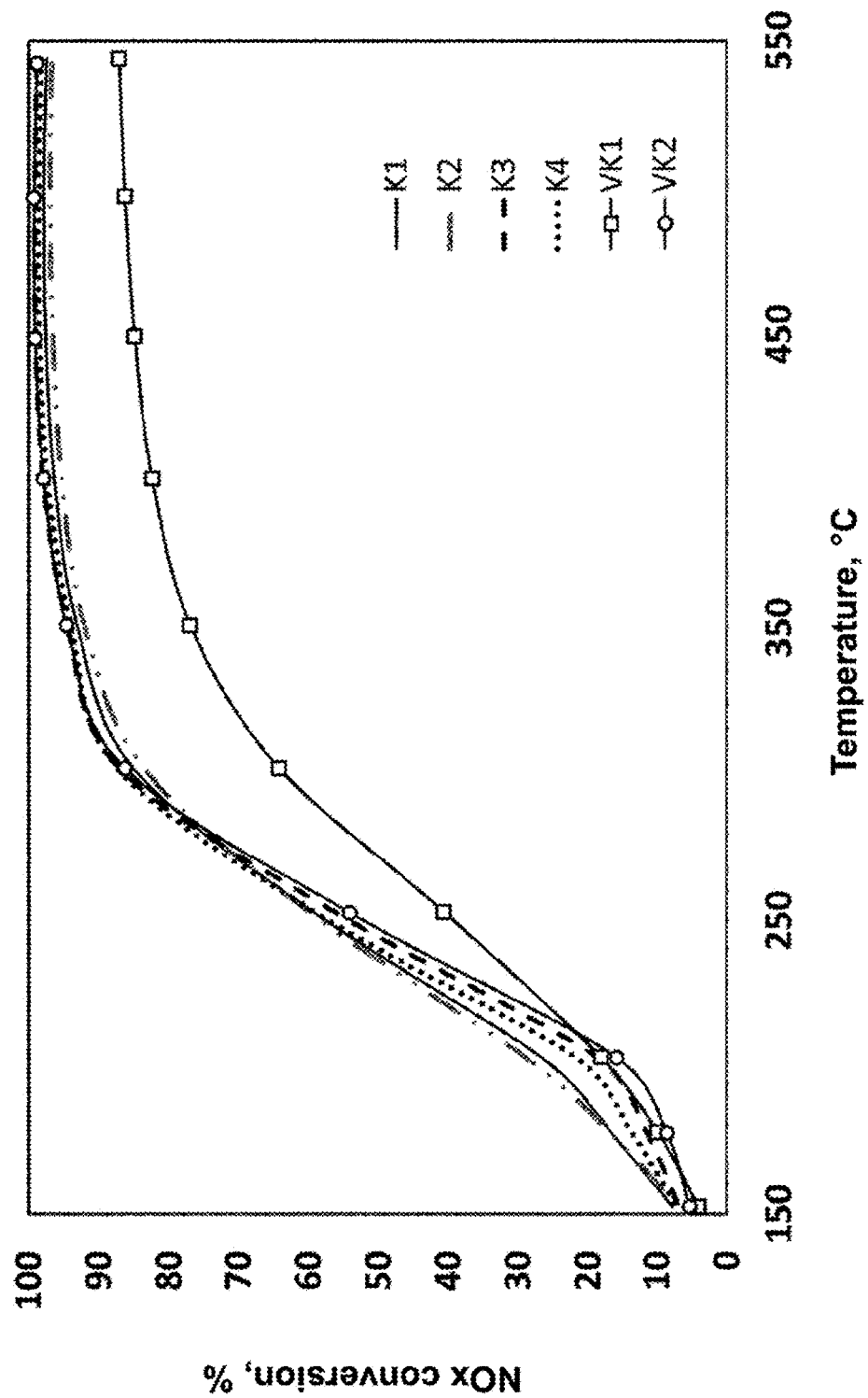

ACTIVE SCR CATALYST

The present invention relates to an active SCR catalyst for reducing nitrogen oxides in the exhaust gas of combustion engines.

Exhaust gases from motor vehicles with a predominantly lean-operated combustion engine contain, in particular, the primary emissions of carbon monoxide CO, hydrocarbons HC, and nitrogen oxides NOx in addition to particle emissions. Due to the relatively high oxygen content of up to 15% by volume, carbon monoxide and hydrocarbons can be made harmless relatively easily by oxidation. However, the reduction of nitrogen oxides into nitrogen turns out to be significantly more difficult.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia. The ammonia used as reducing agent can be made available by dosing an ammonia precursor compound, such as urea, ammonium carbamate or ammonium formate, into the exhaust tract and subsequent hydrolysis.

Certain metal-exchanged zeolites can be used as SCR catalysts, for example. Zeolites are often subdivided by the ring size of their largest pore openings into large-, medium- and small-pore zeolites. Large-pore zeolites have a maximum ring size of 12 tetrahedrally coordinated atoms and medium-pore zeolites have a maximum ring size of 10. Small-pore zeolites have a maximum ring size of 8.

In the field of heavy-duty vehicles, SCR catalysts based on iron-exchanged ß zeolites, i.e., a large-pore zeolite of structure type BEA, are used to a large extent. With these products, however, a relatively strongly pronounced agglomeration of iron particles and a dealumination of the zeolite structure are observed with increasing service life. Rapid damage to an Fe-ß system already occurs at relatively mild conditions of <650°, which occur, for example, in the heavy load range during passive soot regeneration.

There has therefore been no lack of attempts to stabilize Fe-ß products. Thus, WO02/41991 A2 discloses a heat treatment in the presence of water vapor. This is intended to form aluminum oxide chains which are not part of the three-dimensional zeolite structure but nevertheless are associated with or even bound to it.

WO03/022430 A2 teaches improving the hydrothermal stability of an Fe-ß zeolite by increasing the Fe(OH) content in the catalyst. The increase in the Fe(OH) content is to be achieved, inter alia, by bringing the sodium content of the zeolite to less than 500 ppm before the iron exchange.

Despite all these attempts, there continues to be a need for hydrothermally stable Fe-ß zeolites.

It has now surprisingly been found that Fe-ß zeolites are hydrothermally stable if, contrary to the teaching of WO03/022430 A2, they contain a certain amount of sodium which is 500 ppm or higher.

The present invention accordingly relates to a BEA-type zeolite which contains iron, characterized in that it contains sodium in an amount of 0.05 to 1% by weight, the weight percentage being relative to the iron-exchanged zeolite and being calculated as metallic sodium.

The catalyst according to the invention may contain iron in various forms. In particular, it is present in ion-exchanged form. This means that the negative charge produced by formal replacement of $Si^{4+}$ by $Al^{3+}$ ions in the zeolite framework is neutralized by means of a corresponding amount of iron cations. In addition, however, the iron can also be present in part as an iron metal and/or as an iron oxide in the zeolite structure and/or on the surface of the zeolite structure.

BEA-type zeolites are known to the person skilled in the art and can be purchased on the market. In particular, the products known under the name "beta" or "ß" have multiple uses, inter alia also for the production of catalysts for selective reduction of nitrogen oxides from the exhaust gas of combustion engines with ammonia.

BEA-type zeolites which are already iron-exchanged or iron-containing can also be purchased commercially. Alternatively, however, they can also be obtained, for example, through aqueous ion exchange or solid-state ion exchange by methods known per se.

The iron-containing zeolite of the structure type BEA according to the invention has in particular an iron content of 1 to 10% by weight, preferably 3 to 6% by weight relative to the iron-containing zeolite and calculated as $Fe_2O_3$.

According to the invention, the BEA-type zeolite has in particular a SAR (silica-to-alumina molar ratio) of 1 to 50, preferably 5 to 35. Particularly preferred SAR values are 5 to 15, very particularly preferred SAR values are 7 to 12

The sodium content according to the invention ranges from 0.05 to 1% by weight relative to the iron-containing zeolite and calculated as metallic sodium. It has been found that a content of more than 1% by weight strongly promotes the agglomeration of iron in the zeolite and should thus be avoided. The sodium content preferably ranges from 0.1 to 1% by weight, particularly preferably from 0.5 to 1% by weight.

As described for iron above, the sodium is present in particular in ion-exchanged form. However, it can also be present in part as sodium oxide in the zeolite structure and/or on the surface of the zeolite structure.

The iron-containing zeolites of structure type BEA according to the invention can be produced, for example, in a simple and known per se manner by adding an iron compound, for example a water-soluble iron compound, to the zeolite in a first step and adding a sodium compound, for example a water-soluble sodium compound, to the zeolite in a second step.

Iron(III)nitrate has proven to be particularly suitable as the iron compound, while sodium nitrate, sodium sulfate, sodium chloride, sodium acetate or sodium formate, for example, are suitable as the sodium compound.

Alternatively, a water-soluble sodium compound can be added to the zeolite in the first step and a water-soluble iron compound can be added to the zeolite in the second step.

In embodiments of the catalyst according to the invention, it is present in the form of a coating on a carrier substrate. Carrier substrates can be so-called flow-through substrates or wall-flow filters. Both can consist of inert materials, for example silicon carbide, aluminum titanate or cordierite. Such carrier substrates are known to the person skilled in the art and are commercially available.

The application of the catalyst according to the invention to the carrier substrate can be carried out by methods familiar to the person skilled in the art, for example by the customary dip coating methods or pump and vacuum coating methods with subsequent thermal aftertreatment (calcination).

The person skilled in the art knows that in the case of wall-flow filters, the latter's average pore size and the average particle size of the catalyst according to the invention can be adapted to each other such that the resulting coating lies on the porous walls that form the channels of the wall-flow filter (on-wall coating). However, average pore size and average particle size are preferably adapted to one another such that the catalyst according to the invention is located in the porous walls that form the channels of the wall-flow filter, that a coating of the inner pore surfaces thus takes place (in-wall coating). In this case, the average particle size of the catalyst according to the invention must be small enough to penetrate into the pores of the wall-flow filter.

In other embodiments of the catalyst according to the invention, it is itself present as part of a carrier substrate, i.e., for example, of a flow-through substrate or wall-flow filter. In addition to the catalyst according to the invention, these carrier substrates contain a matrix component. All inert materials which are otherwise also used for the production of catalyst substrates can be used as matrix components, i.e., for example, silicates, oxides, nitrides or carbides.

In order to produce catalytically active carrier substrates, a mixture consisting of, for example, 10 to 95% by weight of an inert matrix component and 5 to 90% by weight of catalytically active material is, for example, extruded according to methods known per se.

Alternatively, carrier substrates made of corrugated sheets of inert materials can also be used. Suitable inert materials are, for example, fibrous materials with an average fiber diameter of 50 to 250 µm and an average fiber length of 2 to 30 mm. Preferably, fibrous materials are heat-resistant and consist of silicon dioxide, in particular glass fibers. For the production of such carrier substrates, sheets of the aforementioned fiber materials are, for example, corrugated in the known manner and the individual corrugated sheets are formed into a cylindrical monolithically structured body with channels running through the body. Preferably, a monolithically structured body with a crosswise corrugation structure is formed by stacking a number of the corrugated sheets into parallel layers with different orientation of the corrugation between the layers. In one embodiment, uncorrugated, i.e., flat, sheets can be arranged between the corrugated sheets.

Substrates made of corrugated sheets can be coated directly with the catalyst according to the invention, but they are preferably first coated with an inert material, for example titanium dioxide, and only then with the catalytic material.

The catalyst according to the invention may advantageously be used to purify exhaust gas from lean-operated combustion engines, particularly diesel engines. It converts nitrogen oxides contained in the exhaust gas into the harmless compounds nitrogen and water.

The present invention thus also relates to a method for purifying the exhaust gas of lean-operated combustion engines, characterized in that the exhaust gas is passed over a catalyst according to the invention.

In the method according to the invention, ammonia is preferably used as reducing agent. For example, the required ammonia may be formed in the exhaust gas system upstream of the particle filter according to the invention, e.g., by means of an upstream nitrogen oxide storage catalyst ("lean NOx trap"—LNT). This method is known as "passive SCR."

However, ammonia can also be carried in a suitable form, for example in the form of urea, ammonium carbamate or ammonium formate, and added to the exhaust gas stream as needed. It is common to also carry aqueous urea solution and to meter said aqueous solution into the catalyst according to the invention upstream thereof via an injector as needed.

The present invention accordingly also relates to a system for purifying exhaust gas from lean-operated combustion engines, characterized in that it comprises a catalyst according to the invention, preferably in the form of a coating on a carrier substrate or as part of a carrier substrate as well as an injector for aqueous urea solution, wherein the injector is located upstream of the catalyst according to the invention.

It is, for example, known from SAE-2001-01-3625 that the SCR reaction with ammonia proceeds more quickly if the nitrogen oxides are present in a 1:1 mixture of nitrogen monoxide and nitrogen dioxide, or in any event approach this ratio. Since the exhaust gas of lean-operated combustion engines normally has an excess of nitrogen monoxide compared to nitrogen dioxide, the document proposes to increase the proportion of nitrogen dioxide with the aid of an oxidation catalyst.

The present invention thus also relates to a system for purifying exhaust gas from lean-operated combustion engines, characterized in that it comprises an oxidation catalyst, an injector for aqueous urea solution and a catalyst according to the invention, preferably in the form of a coating on a carrier substrate or as part of a carrier substrate.

In embodiments of the present invention, platinum on a carrier material is used as oxidation catalyst.

All materials that are known to the person skilled in the art for this purpose are considered as carrier material for the platinum. They have a BET surface of 30 to 250 $m^2/g$, preferably of 100 to 200 $m^2/g$ (determined according to DIN 66132), and are in particular aluminum oxide, silicon oxide, magnesium oxide, titanium oxide, zirconium oxide, cerium oxide, and mixtures or mixed oxides of at least two of these oxides. Aluminum oxide and aluminum/silicon mixed oxides are preferred. If aluminum oxide is used, it is particularly preferably stabilized, for example with lanthanum oxide.

The system according to the invention is used such that an oxidation catalyst, then an injector for aqueous urea solution and lastly a catalyst according to the invention are arranged in the direction of flow of the exhaust gas. The oxidation catalyst is typically present as a coating on a carrier substrate. Carrier substrates can be flow-through substrates or wall-flow filters.

The catalyst according to the invention surprisingly has advantages compared to iron-containing BEA-type zeolites which contain a lower or a higher amount of sodium.

The invention is explained in more detail in the following examples and FIGURE.

FIG. 1 shows the SCR activity of K1 to K4, as well as VK1 and VK2 in hydrothermally aged condition (100 hours at 550° C.)

EXAMPLE 1

A commercially available BEA-type zeolite with a SAR of 10 is mixed in water with a quantity of $Fe(NO_3)_3$ having an iron content of 4.5% by weight (relative to the iron-containing zeolite and calculated as $Fe_2O_3$) and stirred overnight. A quantity of sodium nitrate corresponding to 0.5% by weight (relative to the iron-containing zeolite and calculated as metallic Na) is then added and the mixture is stirred for 30 minutes. The suspension obtained in this way is used directly as a coating suspension (washcoat) for coating a commercially available flow-through substrate of cordierite. The catalyst obtained (hereinafter referred to as K1) is dried at 90° C., then calcined step-by-step in air at 350° C. and at 550° C.

EXAMPLE 2

Example 1 is repeated with the difference that the quantity of sodium nitrate is measured in such a way that a loading with sodium of 1% by weight results. The catalyst thus obtained is referred to below as K2.

EXAMPLE 3

Example 1 is repeated with the difference that the quantity of sodium nitrate is measured in such a way that a loading with sodium of 0.1% by weight results. The catalyst thus obtained is referred to below as K3.

EXAMPLE 4

Example 1 is repeated with the difference that the quantity of sodium nitrate is measured in such a way that a loading with sodium of 0.2% by weight results. The catalyst thus obtained is referred to below as K4.

COMPARATIVE EXAMPLE 1

Example 1 is repeated with the difference that the quantity of sodium nitrate is measured in such a way that a loading with sodium of 2% by weight results. The catalyst thus obtained is referred to below as VK1.

COMPARATIVE EXAMPLE 2

Example 1 is repeated with the difference that the addition of sodium nitrate is omitted. The loading with sodium is thus 0% by weight. The catalyst thus obtained is referred to below as VK2.

COMPARATIVE EXPERIMENTS a) The catalysts K1 to K4 as well as VK1 and VK2 were aged and then compared. The aging was carried out at 550° C. in 10% $H_2O$ and 10% $O_2$ in $N_2$ for 100 hours.

b) The SCR activity of the aged catalysts K1 to K4 as well as VK1 and VK2 was tested in a laboratory model gas system under the conditions given in the table below.

| Gas/Parameter | Concentration/Conditions |
| --- | --- |
| $NH_3$ | 1100 ppm |
| NO | 1000 ppm |
| $H_2O$ | 5% |
| $O_2$ | 10% |
| $N_2$ | Remainder |
| Temperature | Cooling step-by-step 550 to 150° C. |
| Space velocity | 60.000 $h^{-1}$ |

The results are shown in FIG. 1.

Accordingly, VK1 overall shows the poorest NOx conversion over the entire temperature range. Although VK2 is nearly equivalent to catalysts K1 to K4 at higher temperatures, it exhibits as poor an NOx conversion as VK1 at lower temperatures. In contrast, the catalysts K1 to K4 according to the invention have significantly better results, in particular at low temperatures. This applies in particular to K1 and K2 (sodium contents of 0.5 or 1% by weight).

The invention claimed is:

1. A catalyst which comprises a carrier substrate and a BEA-type zeolite, said BEA-type zeolite comprising iron and sodium, wherein the amount of sodium is calculated as metallic sodium and is 0.05 to 1% by weight of the iron content of the BEA-type zeolite.

2. The catalyst according to claim 1, wherein the iron content is calculated as $Fe_2O_3$ and ranges from 1 to 10% by weight of the BEA-type zeolite.

3. The catalyst according to claim 2, wherein the iron content is calculated as $Fe_2O_3$ and ranges from 3 to 6% by weight of the BEA-type zeolite.

4. The catalyst according to claim 2, wherein the BEA-type zeolite has a SAR (silica-to-alumina molar ratio) value of 1 to 50.

5. The catalyst according to claim 2, wherein the BEA-type zeolite has a SAR (silica-to-alumina molar ratio) value of 5 to 35.

6. The catalyst according to claim 2, wherein the catalyst comprises a sodium content of 0.1 to 1% by weight.

7. The catalyst according to claim 2, wherein the catalyst comprises a sodium content of 0.5 to 1% by weight.

8. The catalyst according to claim 2, wherein the catalyst is present in the form of a coating on the carrier substrate.

9. The catalyst according to claim 8, wherein the carrier substrate is a flow-through substrate or a wall-flow filter.

10. The catalyst according to claim 8, wherein the carrier substrate is inert and consists of silicon carbide, aluminum titanate, or cordierite.

11. The catalyst according to claim 8, wherein the catalyst forms a part of the carrier substrate.

12. A method for purifying exhaust gas of lean-operated combustion engines, which comprises passing an exhaust gas over a catalyst according to claim 1 or a catalyst comprising the BEA-type zeolite.

13. A system for purifying exhaust gas from lean-operated combustion engines, which comprises a catalyst according to claim 1 or a catalyst comprising the BEA-type zeolite downstream of an injector for an aqueous urea solution.

14. The system according to claim 13, and further comprising an oxidation catalyst.

15. The system according to claim 14, wherein the oxidation catalyst comprises platinum on a carrier material.

* * * * *